Sept. 5, 1944.　　　E. LEE ET AL　　　2,357,672

PIVOTAL CONNECTION

Filed April 16, 1941　　　3 Sheets-Sheet 1

INVENTORS
EARL LEE
O. G. ELLEFSON
BY
Cook & Robinson ATTORNEYS

Sept. 5, 1944.   E. LEE ET AL   2,357,672
PIVOTAL CONNECTION
Filed April 16, 1941   3 Sheets-Sheet 2

EARL LEE
O. G. ELLEFSON
INVENTOR

BY Cook & Robinson
ATTORNEY

Patented Sept. 5, 1944

2,357,672

UNITED STATES PATENT OFFICE 2,357,672

PIVOTAL CONNECTION

Earl Lee, Kent, and Oscar G. Ellefson,
Seattle, Wash.

Application April 16, 1941, Serial No. 388,868

2 Claims. (Cl. 280—33.1)

This invention relates to pivotal connections and mountings, and has reference more particularly to structures that are especially suited for such uses as auto trailer or semi-trailer hitches, fifth wheels and the like, and as turntable mountings, or for various other uses where it is required that a heavy structure be rotatably supported on and connected with another.

It is the principal object of this invention to provide a pivotal connection adapted to the above stated uses that will satisfactorily support an exceedingly heavy load, with an easy pivoting, or turning action. Furthermore, to provide a connection that affords a maximum amount of bearing surface in a minimum space and with provision for the adequate lubrication of the bearing surfaces.

It is also an object of the present invention to provide a novel structure, embodying therein the present form of pivotal connection, that is especially suited for use as an auto trailer hitch; that provides for the safe, satisfactory and substantial joining of the trailer vehicle to a powered vehicle, with an easy means for effecting the disconnection of the trailing vehicle when such is desired.

More specifically stated, the objects of the present invention reside in the details of construction of parts to be associated or assembled for making a pivotal weight supporting and towing connection and in the embodiment of this pivotal connection in a structure especially adapted for use as a trailer hitch, or as a fifth-wheel mechanism.

Still other objects of the invention reside in the details of construction and combination of parts, and in their mode of use as will hereinafter be fully described.

In accomplishing these and other objects of the invention, we have provided the improved details of construction, the preferred forms of which are illustrated in the accompanying drawings, wherein—

Fig. 9 is an elevation, showing the present pivot connection as used in a trailer hitch or turntable mounting, or the like.

Referring more in detail to the drawings:

First describing the construction of the pivot connection as intended for general use, whether it be a part of a trailer hitch, fifth wheel or turntable mounting: The structure embodies a vertically disposed pivot post, designated in its entirety by numeral 1. Preferably, this post is of tubular form, and of substantial diameter, and equipped at its upper end with a projecting flange 2, formed with suitable openings 3 for the reception of bolts 4 for the solid securement of the post to the base, frame or other part of the structure that is to be supported.

Figure 3:
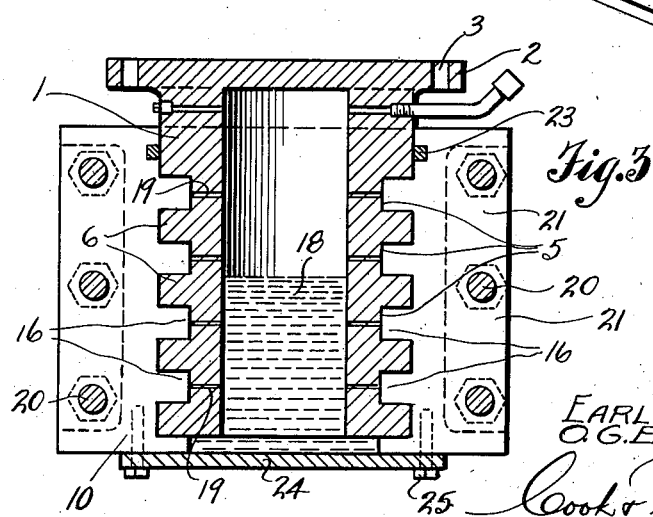
Fig. 3 is a cross sectional view of the pivot post and its housing in assembled relationship.
Figure 6:
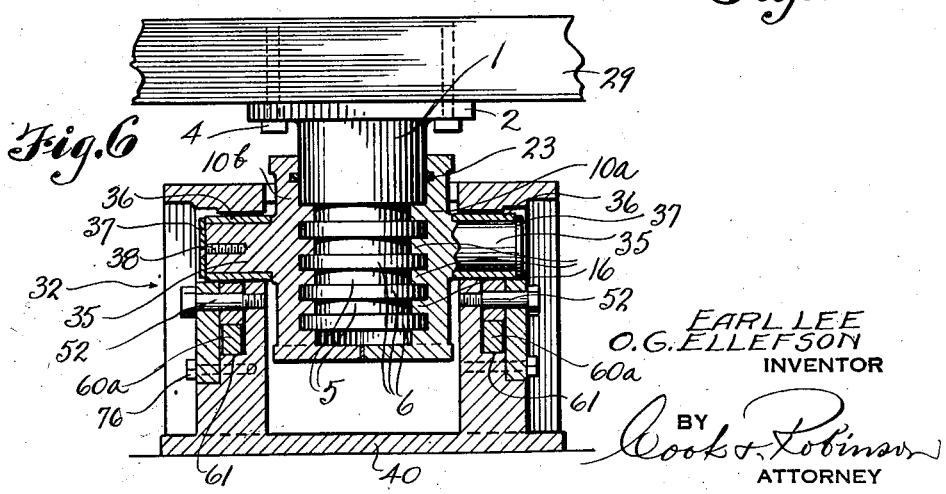
Fig. 6 is a transverse section of the same as seen on line 6—6 in Fig. 5.

The pivot post 1 is formed with a succession of encircling grooves 5 in evenly spaced relationship along the lower portion of the post, as noted best in Figs. 3 and 6; all grooves being square cut and of equal depth and thereby forming, between the successive grooves, the encircling square cut flanges or shoulders 6. In the present instance, we have illustrated the pivot post 1 as being formed with four of the encircling grooves, thereby setting off four of the encircling shoulders, but it is to be understood that the number of grooves and shoulders may be varied to best suit conditions of use or type or kind of equipment. Also, the diameter of the post and the dimensions of grooves and shoulders may be varied to suit conditions.

The pivot post 1 is revolubly fitted in an enclosing and supporting housing 10. In some instances of use, this housing might be permanently anchored to a foundation, and in another use, such as will hereinafter be more fully described, it is adapted for disconnection from its supporting structure. As shown in Figs. 1 to 8, the housing 10 is dismountable, while in Fig. 9 it is shown as equipped with a base flange 11 for the reception of bolts 12 for its fixed securement to a support 13 which might either be of a stationary character or a frame member of an auto trailer supported through the mediacy of springs, such as indicated at 14.

The housing 10 is formed with a vertical, cylindrical bore or chamber rotatably containing the post 1 therein and the side walls of this bore, or chamber are formed with encircling shoulders 16 corresponding in depth and spacing to the dimensions of the annular grooves on the post, so as to be operatively contained in the latter therein as shown in Figs. 3 and 6.

It is to be observed in these drawings, that each of the encircling square cut shoulders of the housing is fitted in one of the annular grooves of the post 10. Therefore, when the pivot post is under load, the entire bottom surface of each shoulder thereon is in supporting contact with the base surface of a groove formed in the housing, and the effective area of supporting surfaces is then the sum of the areas of the bottom surfaces of all the shoulders or flanges of the post.

In order to provide proper lubrication of the bearing surfaces, the housing 10 and tubular post may be utilized to retain a supply of lubricating oil as designated at 18 in Fig. 3, and channels 19 may be bored in the post, leading from the central passage to the outer surfaces of the shoulders or grooves to permit the flow of lubricant to the engaged surfaces.

Figure 2:
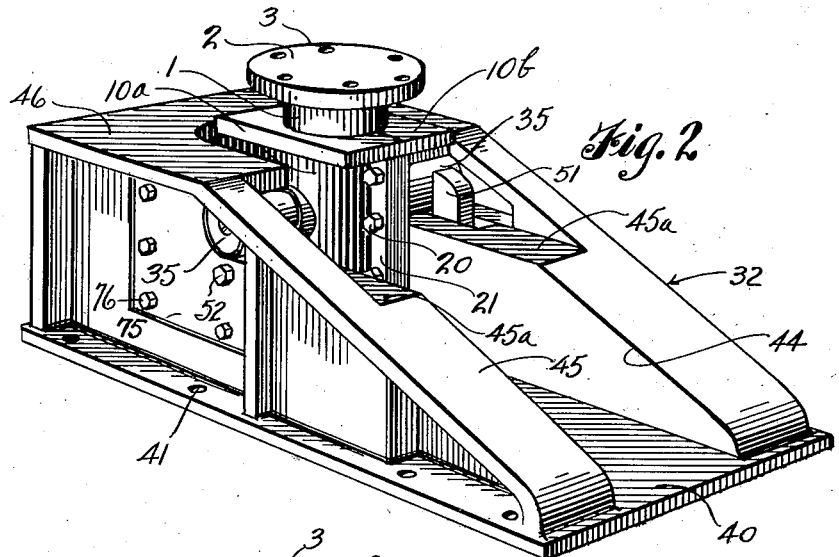
Fig. 2 is a perspective view of the assembled parts constituting the present semi-trailer hitch.
Figure 4:
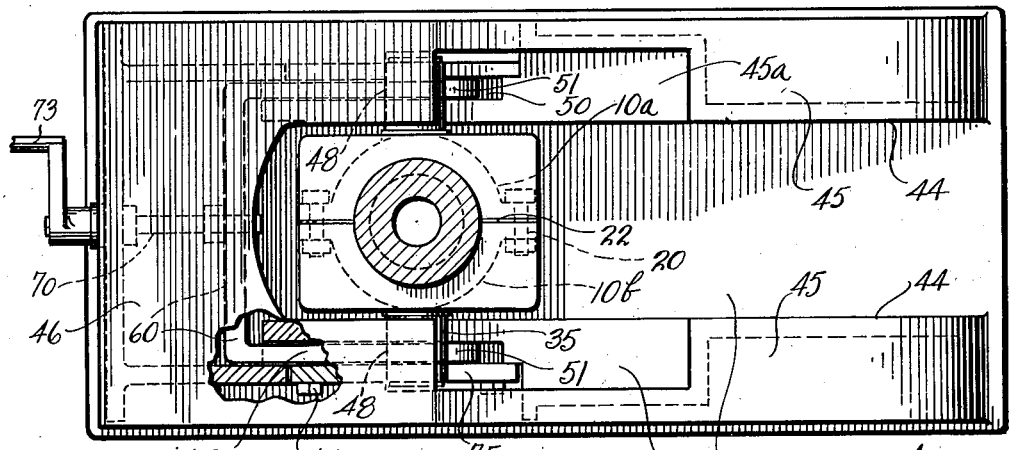
Fig. 4 is a horizontal, sectional view of the hitch mechanism as seen on the line 4—4 in Fig. 5.

In order to facilitate the application of the post 1 to the housing 10, the latter is of two part construction, preferably centrally divided in a plane passing through the axial line of the bore therein, and the complemental parts of the housing, which have been designated in Figs. 2, 4 and 6, by numerals 10a and 10b respectively, after being applied to opposite sides of the pivot post, as shown, are joined together by bolts 20 that are passed through the assembled parts at opposite sides of the post as shown. Preferably, the housing is flanged at opposite sides, as at 21, and receives the bolts through these flanges. Shims 22, of suitable thickness, are applied as necessary, between the joining faces of the two parts of the housing. Also, to prevent leakage of oil, a sealing ring 23 is inserted about the post within the upper end portion of the housing bore, as noted in Fig. 6, and the lower end of the housing is closed by a cover plate 24 held by bolts 25.

With the pivot post and its housing so constructed, the assembly is very satisfactory for the mounting of turntables, gun mountings and for general usage where a simple, durable, rigid and long wearing pivotal support is required. When so used, the housing 10 would be anchored to a base contained therein, and the object to be mounted would be secured upon the post by passing of bolts through the flange 2.

Figure 1:
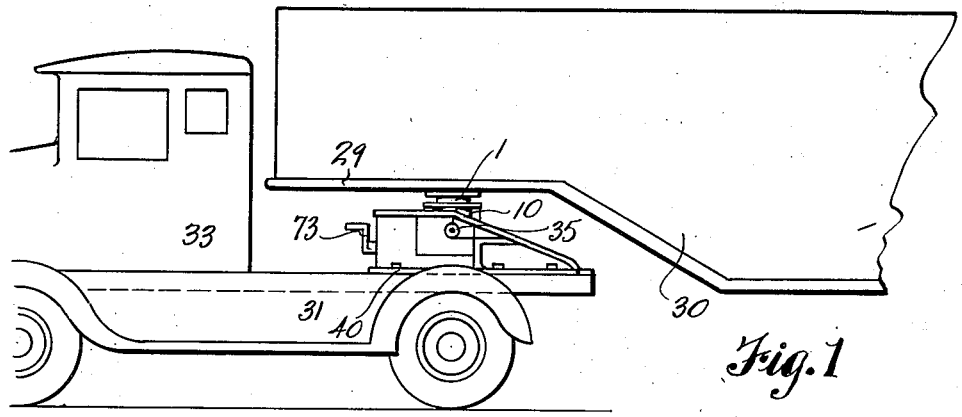
Fig. 1 is a view illustrating, in side elevation, parts of an auto trailer unit that is equipped with a hitch embodied by the present invention.

In the present drawings, particularly in Figs. 1, 5, 7 and 8, we have featured the use of the present pivot as a part of a semi-trailer hitch mechanism. In this particular use, and in this arrangement of parts, the base flange 2 of the pivot post is bolted to the base frame member 29 of the semi-trailer vehicle, which, in Fig. 1, is designated generally by reference numeral 30, while the housing 10 is equipped for releasable mounting in a base structure 31 that is mounted on the frame structure 32 of the powered vehicle, or truck, which is indicated generally by reference numeral 33.

Figure 5:
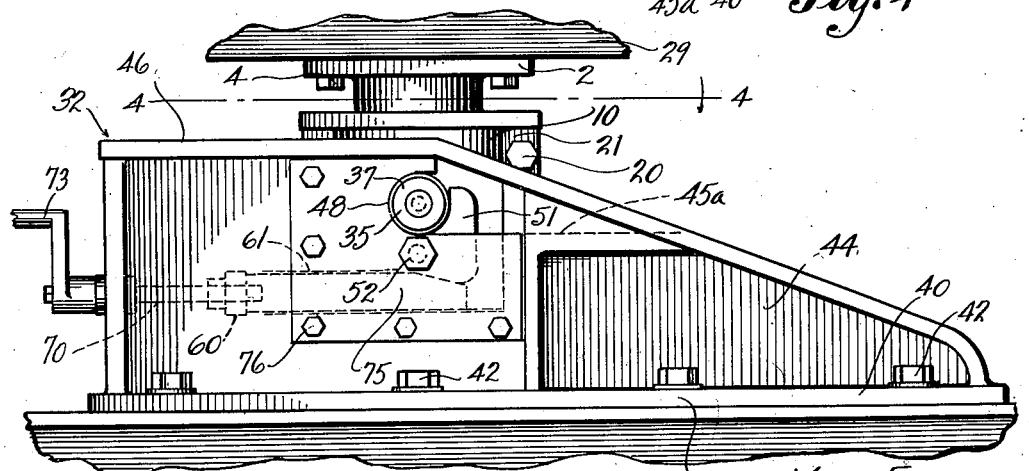
Fig. 5 is a side view of the hitch forming structure.

By referring more particularly to Figs. 2, 4, 5 and 6, it will be understood that the housing 10 as used for the hitch, is constructed as has already been described, except that it has no base or anchoring flange for permanent attachment, but is equipped at opposite sides with trunnions 35—35 which are adapted to functionally mount it in the frame structure 32. The trunnions are axially alined, and each is fitted with a bearing sleeve 36 that is rotatable thereon, and held by a washer 37 and countersunk screw bolt 38 applied to the end of the trunnion. The supporting structure 32, as used in the semi-trailer hitch, comprises a horizontal base plate 40 designed to be bolted to or otherwise fixedly mounted upon the frame structure 31 of the powered vehicle. In Figs. 2 and 5, the base plate 40 is shown as equipped with holes 41 through which anchor bolts 42 are extended, and which bolts are secured in the frame structure of the track.

Along opposite sides of the base plate, are upstanding rails 44—44, disposed in parallel relationship, with ends spaced apart for the reception and disposition of the housing 10 between them as in Fig. 6, and having flat top surfaces 45—45 that are inclined upwardly from the rear edge of the plate 40 to a flat top plate 46 that extends between the rails at their forward ends. At a distance about half way up the inclined top portions of the rails, the surfaces 45 merge into horizontal tracks, designated by reference numerals 45a, as seen in Fig. 2, which lead rearwardly and directly into rearwardly facing semi-circular seats 48, as seen best in Figs. 2 and 7.

These two seats are so spaced apart transversely of the hitch as to receive the two supporting trunnions 35—35 of the housing 10 therein, and when the trunnions are located in their respective seats, as seen in Fig. 2, they may be positively held operatively retained therein, thus to provide a holding or towing connection between the powered truck 32 and the trailing vehicle 30.

Figure 8:
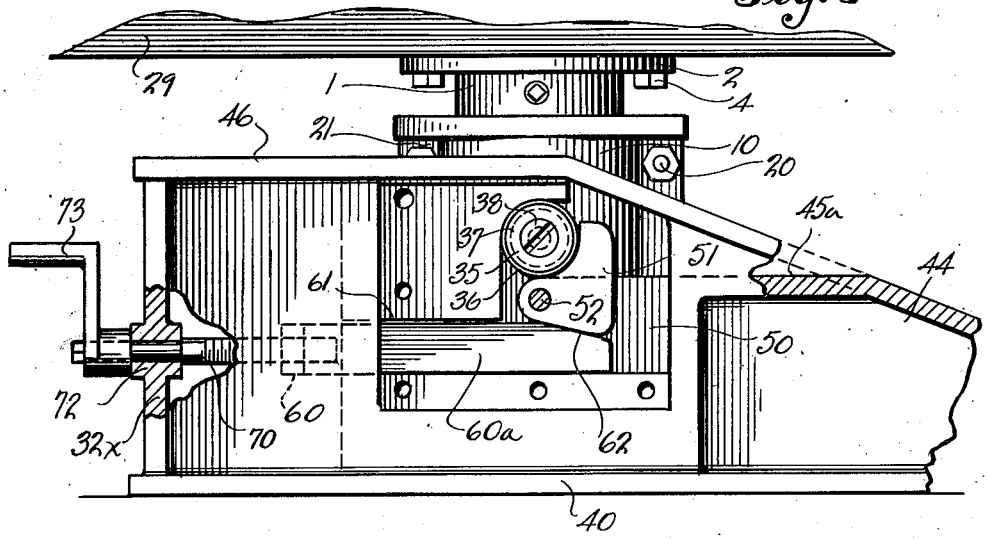
Fig. 8 is a similar view of the parts, but showing the parts as secured in connection by the latch, which is here shown in "holding" position.

The feature of the outer longitudinal portions of the inclined rails continuing beyond the horizontal surfaces 45a and above the level of the seats 48 is in order that they will operate as guides upon which the nose of the trailer frame may slide in assembling the trailer and truck, as will be understood by reference to the showing of parts in Fig. 8. This nose portion of the trailer thus supports the trailer until the trunnions engage with the lower ends of the rails, then the trunnions carry the load as they roll up the rails, onto surfaces 45a and finally move into the seats 48.

Figure 7:
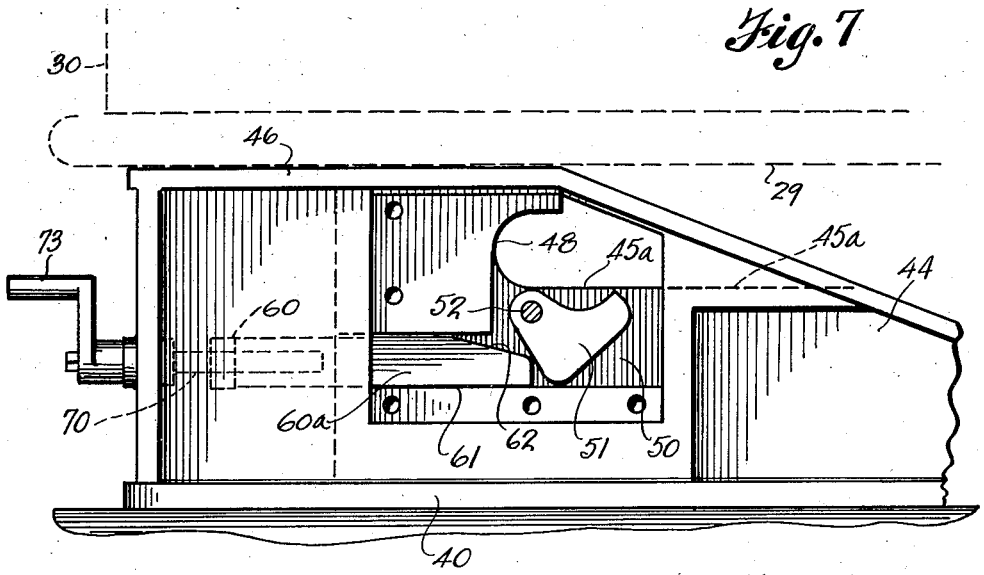
Fig. 7 is a view, in side elevation, of a part of the structure and with a side plate removed for better illustrating the latch member for locking the parts of the hitch together; the latch member being shown in its "released" position.
Figure 9:
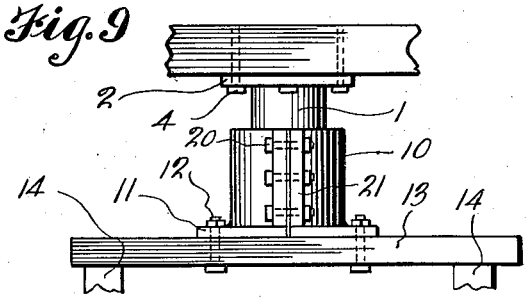

The means whereby the trunnions are operatively retained in their respective seats 48 is illustrated best in Figs. 7 and 8, wherein it is noted that, formed in the two side rails 44—44, just rearwardly of each seat and opening to the flat surfaces 45a, are recesses 50 in each of which a latch plate 51 is pivotally fixed by a pivot bolt 52. The latch plates are substantially of rightangular form, and are so held, by their respective pivot bolts 52, which extend through one end thereof, that, when not otherwise supported, they will drop down in the recesses below the surfaces 45a for the unobstructed travel of the trunnions 35 along the rail top surfaces into or from the seats 48. When the trunnions are seated, as shown in Fig. 2 or 8, the latch plates may be swung upwardly from the recesses so that the leg at the free end of each latch will holdingly engage and retain the corresponding trunnion in its seat as shown in Figs. 5 and 9.

The means which we have provided for actuation and for control of the two latch plates 51 comprises a yoke-like slide member 60, with its opposite leg portions, 60a—60a, disposed horizontally and slidably contained in guideways 61 in the rails 44. These guideways open into the recesses 50, as noted in Figs. 8 and 9. Each leg portion of the yoke has an inclined top surface 62 adapted to engage and rock the corresponding latch upwardly when the yoke is moved inwardly as from the position of Fig. 8 to that of Fig. 9. This lifts the latches to positions for positive securement of the trunnions in their seats, yet while the trunnions are thus retained, the housing 10 is free to rock or rotate about the axial line of the two trunnions and the pivot post may rotate in the housing. This affords a complete universal joint movement for the connected parts.

Withdrawal of the yoke legs will release the latches for the disconnection of the parts, and when this disconnection is effected, the trunnions operate as supporting rollers for travel of the housing 10 rearwardly on the rearwardly inclined surfaces of the two rails.

For actuation of the yoke, we provide a shaft 70 that has a threaded connection at one end with the base of the yoke, as noted in Fig. 4, and at its other end, is rotatably fixed in a bearing 72 formed in the rear end wall 32x of the support 32, as noted in Fig. 8. A crank 73 is fixed on the shaft to rotate it. Rotation in opposite directions will shift the yoke forwardly or rearwardly as required for release or holding of the latch plates.

In order that the latch mechanism may be more readily assembled with the base structure, the side faces of the rails are equipped with removable face plates, designated by reference numeral 75, and these overlie the latch plate recesses and are held in place by bolts 76.

It is to be understood that the hitch just described might be changed in its structure as required to meet conditions, and therefore it is not the intent that the claims which terminate this specification shall be confined to details, but that they be given an interpretation commensurate with the scope of the invention disclosed.

Having thus described our invention, what we claim as new therein and desire to secure by Letters Patent is:

1. A trailer hitch comprising a vertical pivot post equipped at its upper end for fixed attachment to a trailer frame, a bearing member equipped at opposite sides with alined trunnions and a mounting adapted to be fixed to a vehicle frame and to contain the said trunnions pivotally therein; said bearing member having a cylindrical chamber closed at its lower end in which said pivot post is rotatably fitted; said post being formed with a succession of spaced, encircling, square-cut channels, and said bearing being formed, in the bore, with a succession of spaced, square-cut shoulders fitted in said post channels for the securement and support of the post in the bearing; said post having a body chamber for a lubricant and having channels leading from the chamber and directed to the engaged surfaces of the shoulders and channels for supplying the lubricant thereto.

2. An auto-trailer hitch comprising a downwardly directed pivot post equipped at its upper end for securement to a trailer frame structure, and a mounting bearing, equipped at its lower end for fixed securement to the frame of a powered vehicle; said post being hollow and having a plurality of spaced, square-cut, encircling channels of equal width and depth therein and ducts from the hollow interior to the channels, and said bearing being formed in the bore with spaced, annular square-cut shoulders fitted in said channels for support and rotatable securement of the post in the bearing.

EARL LEE.
OSCAR G. ELLEFSON.